INVENTOR.
Jorgen Remmen
BY William B. Jaspert
Attorney.

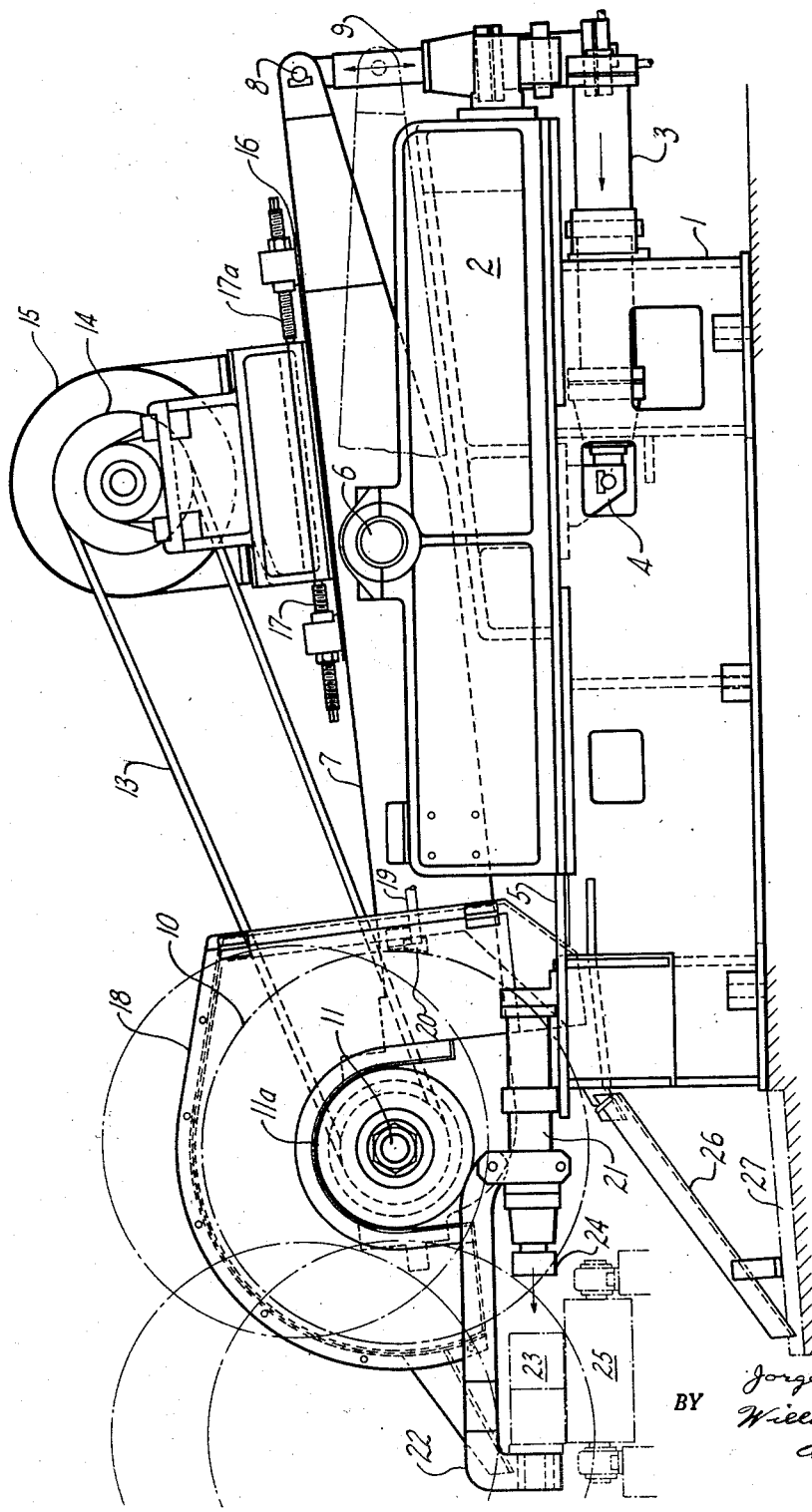

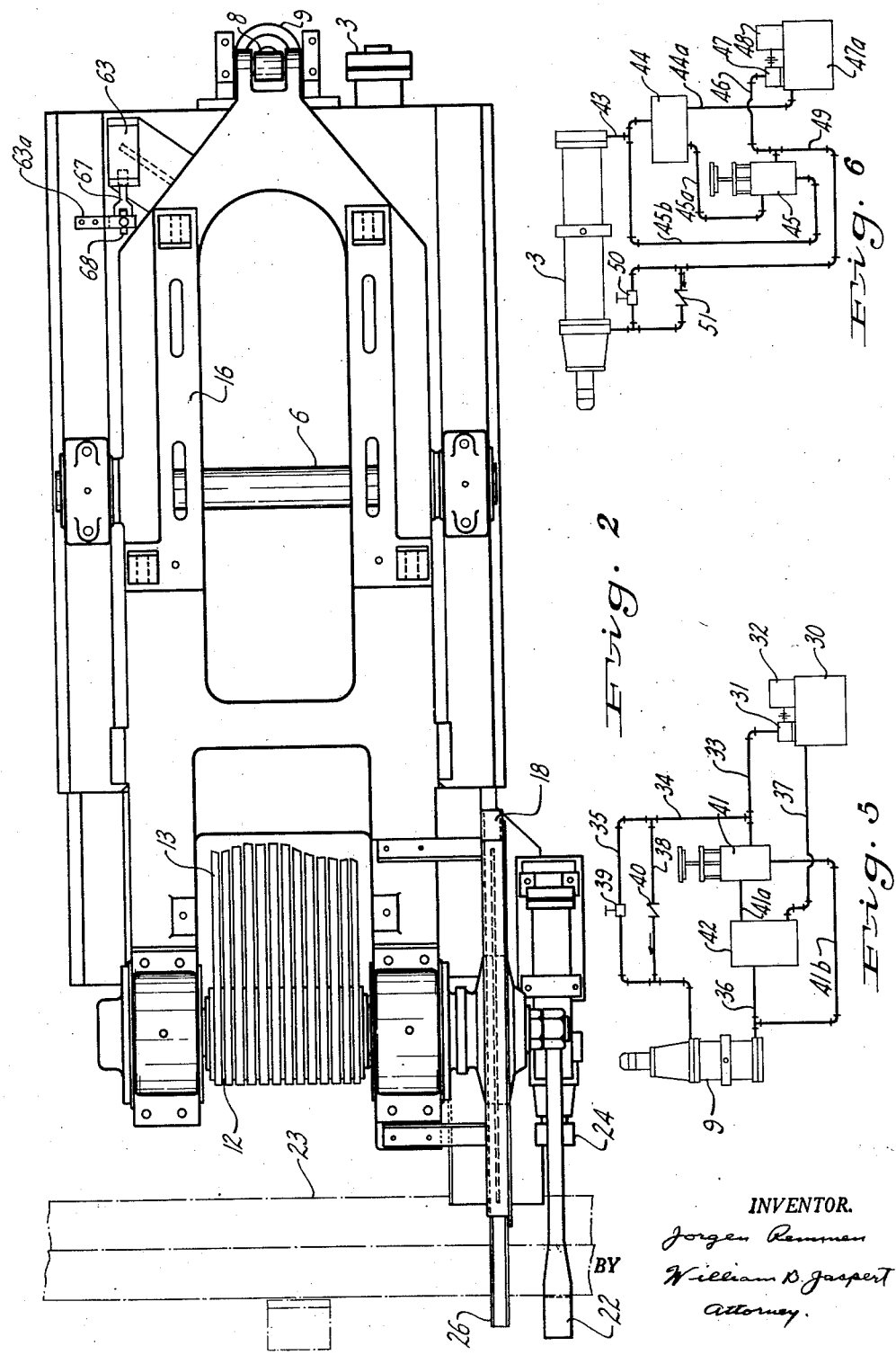

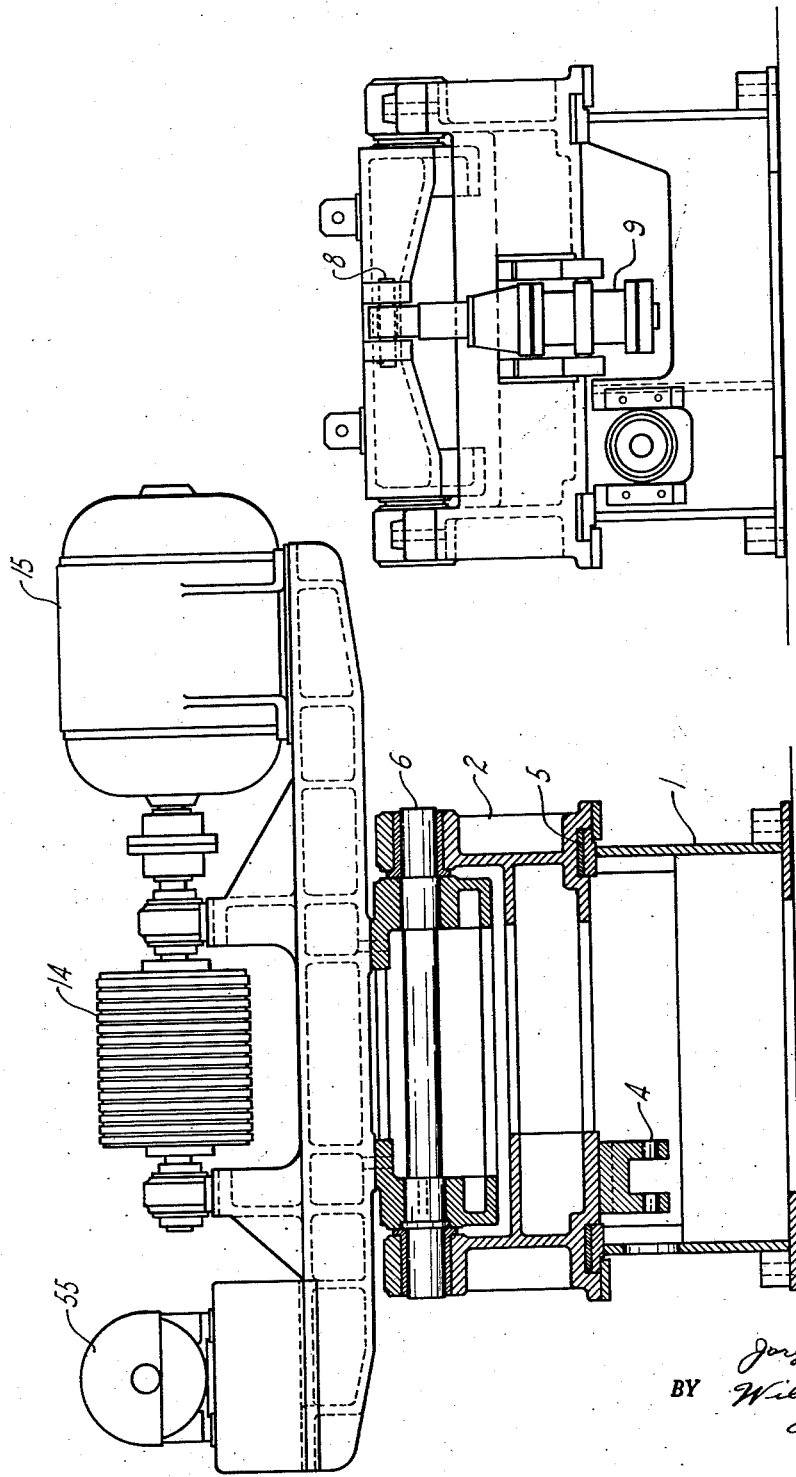

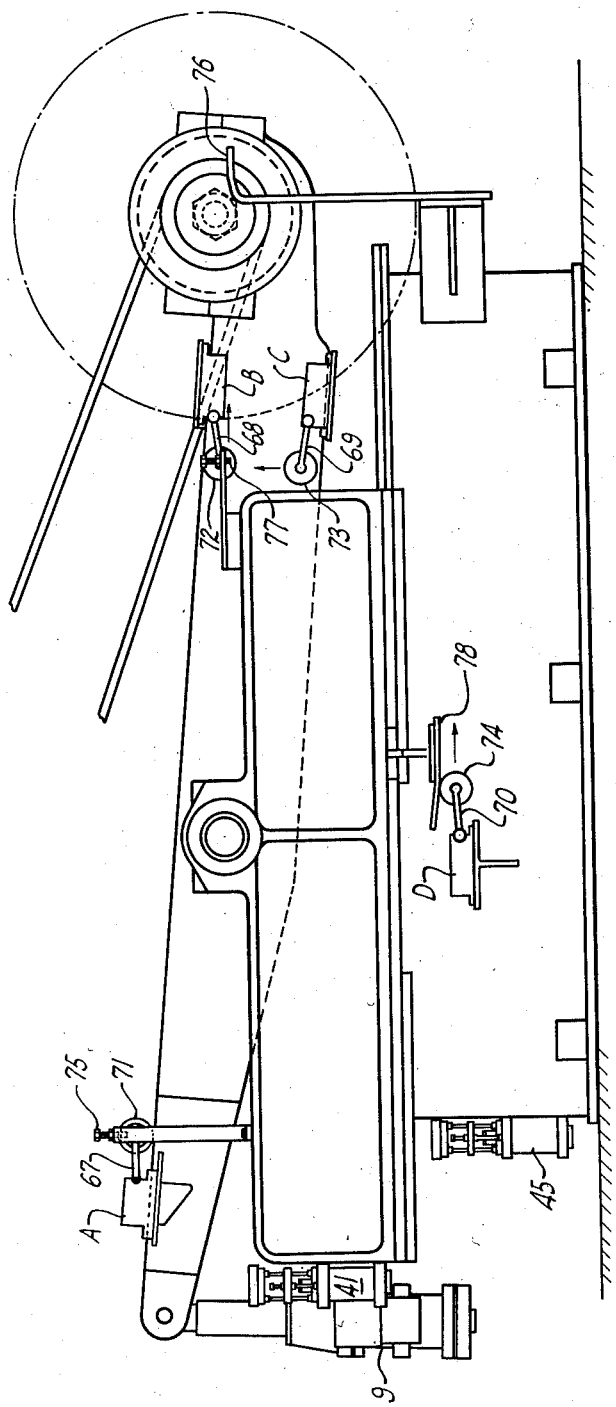

United States Patent Office 2,801,458
Patented Aug. 6, 1957

2,801,458
POWER FEED MECHANISM FOR HOT OR COLD SAWS

Jorgen Remmen, Pittsburgh, Pa.

Application July 7, 1954, Serial No. 441,793

8 Claims. (Cl. 29—69)

This invention relates to new and useful improvements in power saws, for cutting hot or cold slabs of either narrow or wide widths, having hydraulically actuated feed means that is electrically controlled by the vertical and horizontal cutting and return movements of the saw.

It is among the objects of this invention to provide automatic operation of a saw which is subjected to vertical movement only in cutting narrow slabs, and both vertical and horizontal movement when cutting wide slabs and which will be capable of cutting slabs of the same width as the maximum horizontal cutting stroke of the saw.

It is still a further objelt of the invention to provide lontrol means for energizing the saw operating mechanism throughout its complete vertical and horizontal cutting cycle once the initial control element has been set.

It is a further object of the invention to provide a water cooling spray for the saw for use in cutting hot or cold slabs which is controlled by movement of the saw.

The invention further contemplates the use of limit switches located on the saw carriage and on the saw beam in such manner that they will automatically reset to energize the coils controlling the hydraulic operating cylinders at the different positions of the saw in its lowering, cutting and vertically lifting strokes.

The invention will become more apparent from a consideration of the accompanying drawings consituting a part hereof in which like reference characters designate like parts, and in which—

Fig. 1 is a side elevational view of a power saw embodying the principles of this invention;

Fig. 2 is a top plan view of the arm with the saw drive motor removed;

Fig. 3 is a vertical section partially in elevation of the saw base carriage and saw arm;

Fig. 4 is a rear elevational view thereof;

Figs. 5 and 6 are diagrammatic views of the vertical and horizontal operating cylinders and their associated control parts, respectively.

Fig. 7 is a side elevational view of the saw arm, carriage and base illustrating the location of the limit switches thereon;

Figure 13:
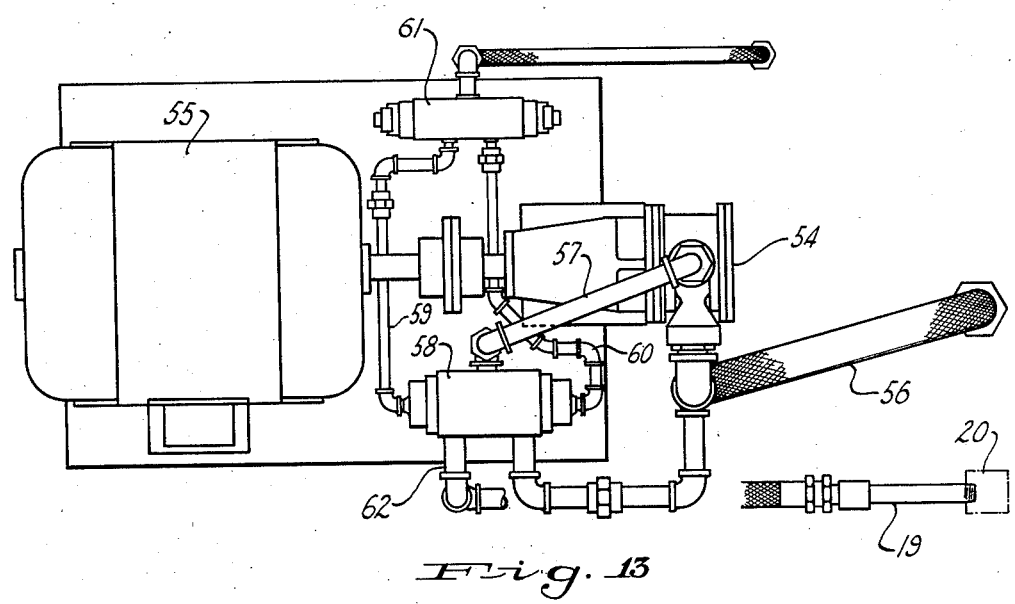
Figures 11, 12:
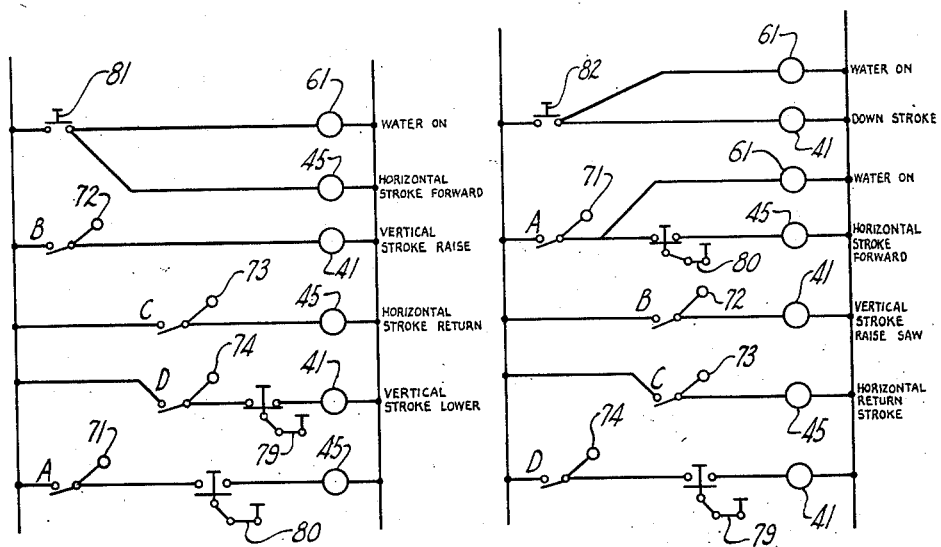

Figs. 8, 9 and 10 are diagrammatic views illustrating respectively, the vertical cutting operation for cutting small slabs; the normal position of the saw preparatory to the cutting of average width slabs; and the raised position of the saw preliminary to its vertically downward cutting movement to enter a relatively wide slab prior to moving horizontally during the cutting stroke to cut through the slab;

Figs. 11 and 12 are wiring diagrams of the switches and solenoids controlling the horizontal and vertical stroke cylinders; and Fig. 13 is a top plan view of a water supply system that is automatically controlled with the working of the saw for supplying a coolant to the saw during the cutting operation.

With reference to Figure 1 of the drawing, the numeral 1 designates a base on which is mounted a carriage 2 that is actuated by a piston and cylinder generally designated by the numeral 3 connected to the carriage at 4 to subject it to horizontal movement on the ways 5. Mounted on the carriage 2 by trunnions 6 is a saw arm 7 that is pivotally connected at 8 to a piston and cylinder operating mechanism 9 for subjecting the saw arm 7 to tilting or rocking movement about the trunnions 6. At one end of the arm 7 is a saw generally designated by the numeral 10 that is mounted on a shaft 11 which carries a sheave wheel 11a with a plurality of grooves 12 as shown in Figure 2 that are connected by V-belts 13 to a pulley 14, Figure 3 the pulley being driven by a motor 15 upon a support 16, Figures 1 and 2. The motor and sheave wheel may be adjustably mounted by means of adjusting screws 17 and 17a, Figure 1, to obtain the desired tension on the V-belts 13.

In Figures 1 and 2 a saw guard 18 is mounted around the saw and a coolant is supplied inside of the guard through a pipe 19 having a nozzle 20 as shown in Figure 1.

Founted on the base 1 is a piston cylinder 21 having an extension 24 that constitutes an abutment for slabs to be cut designated by the numeral 23. This piston element 24 is disposed in the cylinder 21 and is designed to engage the slabs 23 by movement in the direction designated by the arrow in Figure 1.

A conveying mechanism generally designated by the numeral 25 is provided beneath the saw to convey the slabs 23 beneath the saw to be successively cut as desired. A trough 26, Figure 1, directs the coolant from the saw to a trough designated by the numeral 27. As shown in Figure 5, the vertical operating cylinder 9 is connected to a reservoir 30 from which a pump 31 operated by motor 32 delivers hydraulic fluid to the cylinder 9 by conduits 33, 34 and 35, the return flow of the fluid being through conduits 36 and 37.

Needle valve 39 is disposed in line 35 and a check valve 40 in shunt line 38 so that only a certain predetermined amount of pressure is constantly applied to the front end of cylinder 9 from line 34.

Control valve 41, Figs. 5 and 7, is a double coil solenoid valve actuated by limit switches, as will be hereinafter explained, so that one position of the valve applies full pump pressure through line 41b to drive the cylinder piston upward and line 36 is blocked by reversing valve 42. When the control valve 41 is shifted by the other coil of the solenoid, pressure is applied through line 41a to move the reversing valve 42 to connect line 36 through line 37 to reservoir 30 and thereby relieve the pressure applied to the bottom of cylinder 9. The positive pressure supplied through lines 35 and 38 is now sufficient to force the piston in cylinder 9 to return to its lower position.

In the diagram shown in Figure 6, the horizontal stroke cylinder 3 is hydraulically connected by conduit 43 to a reversing valve 44 then to a double coil solenoid valve 45, Figs. 6 and 7, connected by conduit by conduit 46 to a pump 47 mounted on reservoir 47a and operated by motor 48. Conduit 49 also connects with the conduit 46 and is connected to one end of the hydraulic cylinder 3 through a needle valve 50 and a check valve 51.

The double coil solenoid valve 45 operates in the same manner as valve 41 of Figure 5 so that full pressure from pump 47 is applied to the end of cylinder 3 through lines 45b and 43 when the valve is actuated by one of its coils, and the pressure is relieved by opening reversing valve 44 to connect line 43 through line 44a to the reservoir 47a, so that the pressure applied through line 49 is sufficient to return the piston to the rear end of cylinder 3.

The water cooling of saw 10 is effected by the pump 54 driven by motor 55, Fig. 13. Pump 54 is connected by conduit 56 to a source of water supply not shown, and by pipe 57 to a valve 58 that is connected by pipe lines 59 and 60 to pilot valve 61. A conduit 62 supplies the water from valve 58 through conduit 19 and nozzle 20 to saw 10 as shown in Fig. 1.

The operation of the saw is controlled by limit switches and valves shown in Figs. 5, 6 and 7 as follows:

A, B, C and D, Fig. 7 are respectively limit switches having arms 67, 68, 69 and 70 with rollers 71, 72, 73 and 74 that engage cam plates or adjustable stops 75, 76, 77 and 78 respectively. The limit switches energize solenoid operated pilot valves 41 and 45 diagrammatically shown in Figs. 11 and 12 of the drawings as shown and selector switches 80 and 81 are provided to set the machine for the narrow saw cut of Fig. 9, or the wide saw cut of Fig. 10.

With the saw down in its retracted position, as shown in Fig. 7, the selector switch 79 is closed to make limit switch D operative, and selector switch 80 is open to make limit switch A inoperative. As shown in the control diagram of Fig. 11, the saw cut is initiated by the operation of push button switch 81 making momentary contact which energizes one coil of the solenoid valve 45 of the horizontal cylinder 3 to effect the forward cutting stroke of the saw, as seen in Fig. 9. At the end of the stroke, roller 72 will strike cam 76 closing limit switch B, which energizes the raised coil of control switch 41 of the vertical stroke cylinder 9 to raise the saw. When the roller 73 strikes stop 77, switch C will energize the return coil of valve 45 and the cylinder 3 will return the saw to its original horizontal position, as shown in Fig. 7, and when cam plate 78 strikes roller 74, switch D will energize the lowering coil of cylinder 9 to lower the saw. This completes the cycle of a narrow cut.

When extremely wide saw cuts are made, as shown in Fig. 10, the saw is operated in accordance with the control diagram of Fig. 12 wherein limit switch A is placed in operation by closing selector switch 80, and limit switch D is made inoperative by opening the selector switch 79. Push button 82 begins the operation by energizing the lowering coil in the valve 41 so that the saw reaches the right dotted position of Fig. 10 where limit switch A can initiate the forward stroke when roller 71 strikes stop 75. Solenoid valve 45 causes the horizontal stroke cylinder 3 to move the saw transversely to the left until cam 76 strikes switch B and causes the saw to raise until roller 73 strikes stop 77, so that the saw is returned to the right by energizing the return coil of valve 45, as before described in conjunction with a narrow saw cut. The cycle of the wide saw cut is complete and the saw is left in the upper position shown in Fig. 10, since limit switch D is inoperative in this cut.

For extremely small saw cuts which require only the vertical movement of the saw, as shown in Fig. 8, only one push button switch (not shown) is used to initiate the downward stroke and switch A may be used to initiate the vertical return stroke of the solenoid valve 41.

As shown in Fig. 11, pilot valve 61 of water pump valve 58 Fig. 13, is energized to turn the water on during the forward cutting stroke of Fig. 9 and also during the vertical and transverse cutting strokes of the saw as shown in Fig. 10.

I claim:

1. In a power saw for cutting hot or cold slabs by vertical or horizontal strokes, a base, a carriage on said base, a saw arm pivotally mounted on said carriage having a circular saw journaled in one end thereof and having a fluid piston connection with a hydraulic cylinder at the other end of said arm, a fluid cylinder and piston connected to said carriage for subjecting the same to reciprocal movement on its base, drive mechanism for the saw mounted on the saw arm, means for actuating the arm tilting piston to raise and lower the saw, means for actuating the carriage reciprocating piston to effect horizontal movement of the saw and means in the path of vertical and horizontal movement of the saw for initiating and stopping the saw cutting movements.

2. In a power saw for cutting hot or cold slabs by vertical or horizontal strokes, a base, a carriage on said base, a saw arm pivotally mounted on said carriage having a circular saw journaled in one end thereof and having a fluid piston connection with a hydraulic cylinder at the other end of said arm, a fluid cylinder and piston connected to said carriage for subjecting the same to reciprocal movement on its base, drive mechanism for the saw mounted on the saw arm means for actuating the arm tilting piston to raise and lower the saw, means for actuating the carriage reciprocating piston to effect horizontal movement of the saw and means in the path of vertical and horizontal movement of the saw for coordinating such movements.

3. In a power saw for cutting hot or cold slabs by vertical or horizontal strokes, a base, a carriage on said base, a saw arm pivotally mounted on said carriage having a circular saw journaled in one end thereof and having a fluid piston connection with a hydraulic cylinder at the other end of said arm, a fluid cylinder and piston connected to said carriage for subjecting the same to reciprocal movement on its base, drive mechanism for the saw mounted on the saw arm, means for actuating the arm tilting piston to raise and lower the saw, means for actuating the carriage reciprocating piston to effect horizontal movement of the saw and means in the path of forward travel of the carriage to actuate the piston to raise the saw at the end of the forward travel of the saw.

4. In a power saw for cutting hot or cold slabs by vertical or horizontal strokes, a base, a carriage on said base, a saw arm pivotally mounted on said carriage having a circular saw journaled in one end thereof and having a fluid piston connection with a hydraulic cylinder at the other end of said arm, a fluid cylinder and piston connected to said carriage for subjecting the same to reciprocal movement on its base, drive mechanism for the saw mounted on the saw arm, means for actuating the arm tilting piston to raise and lower the saw, means for actuating the carriage reciprocating piston to effect horizontal movement of the saw, and means in the path of vertical movement of the saw to actuate the carriage piston to return the saw to its starting position.

5. In a power saw for cutting hot or cold slabs by vertical or horizontal strokes, a base, a carriage on said base, a saw arm pivotally mounted on said carriage having a circular saw journaled in one end thereof and having a fluid piston connection with a hydraulic cylinder at the other end of said arm, a fluid cylinder and piston connected to said carriage for subjecting the same to reciprocal movement on its base, drive mechanism for the saw mounted on the saw arm, means for actuating the arm tilting piston to raise and lower the saw, means for actuating the carriage reciprocating piston to effect horizontal movement of the saw, and means in the path of rearward movement of the saw to actuate the saw arm piston to lower the saw to its initial cutting position.

6. In a power saw for cutting hot or cold slabs by vertical or horizontal strokes, a base, a carriage on said base, a saw arm pivotally mounted on said carriage having a circular saw journaled in one end thereof and having a fluid piston connection with a hydraulic cylinder at the other end of said arm, a fluid cylinder and piston connected to said carriage for subjecting the same to reciprocal movement on its base, drive mechanism for the saw mounted on the saw arm, reversing valves for said saw arm and carriage piston cylinders, solenoid control valves for energizing said reversing valves and limit switches mounted on said saw arm and carriage for energizing said solenoid control valves.

7. In a power saw for cutting hot or cold slabs by vertical or horizontal strokes, a base, a carriage on said base, a saw arm pivotally mounted on said carriage having a circular saw journaled in one end thereof and having a fluid piston connection with a hydraulic cylinder at the other end of said arm, a fluid cylinder and piston connected to said carriage for subjecting the same to reciprocal movement on its base, drive mechanism for the saw mounted on the saw arm, reversing valves for said saw arm and carriage piston cylinders, solenoid control valves for energizing said reversing valves, limit switches in normally open position electrically connected to said solenoid control valves and mounted on said saw arm and carriage and stops in the path of travel of said limit switches for closing the solenoid valve circuits.

8. A power saw for cutting hot or cold slabs by vertical strokes, a base, a carriage on said base, a saw arm pivotally mounted on said carriage having a circular saw journaled in one end thereof and having a fluid piston connection with a hydraulic cylinder at the other end of said arm, drive mechanism for the saw mounted on the saw arm, a reversing valve for the saw arm piston, a solenoid control valve for energizing the reversing valve, a push button switch and a limit switch for energizing the solenoid valve to lower and raise the saw arm.

References Cited in the file of this patent

UNITED STATES PATENTS

| | | |
|---|---|---|
| 2,638,122 | Jull | Aug. 9, 1927 |
| 2,518,018 | Jung | Aug. 8, 1950 |
| 2,649,646 | Remmen | Aug. 25, 1953 |
| 2,704,913 | Soderlund | Mar. 29, 1955 |